United States Patent Office 3,017,996
Patented Jan. 23, 1962

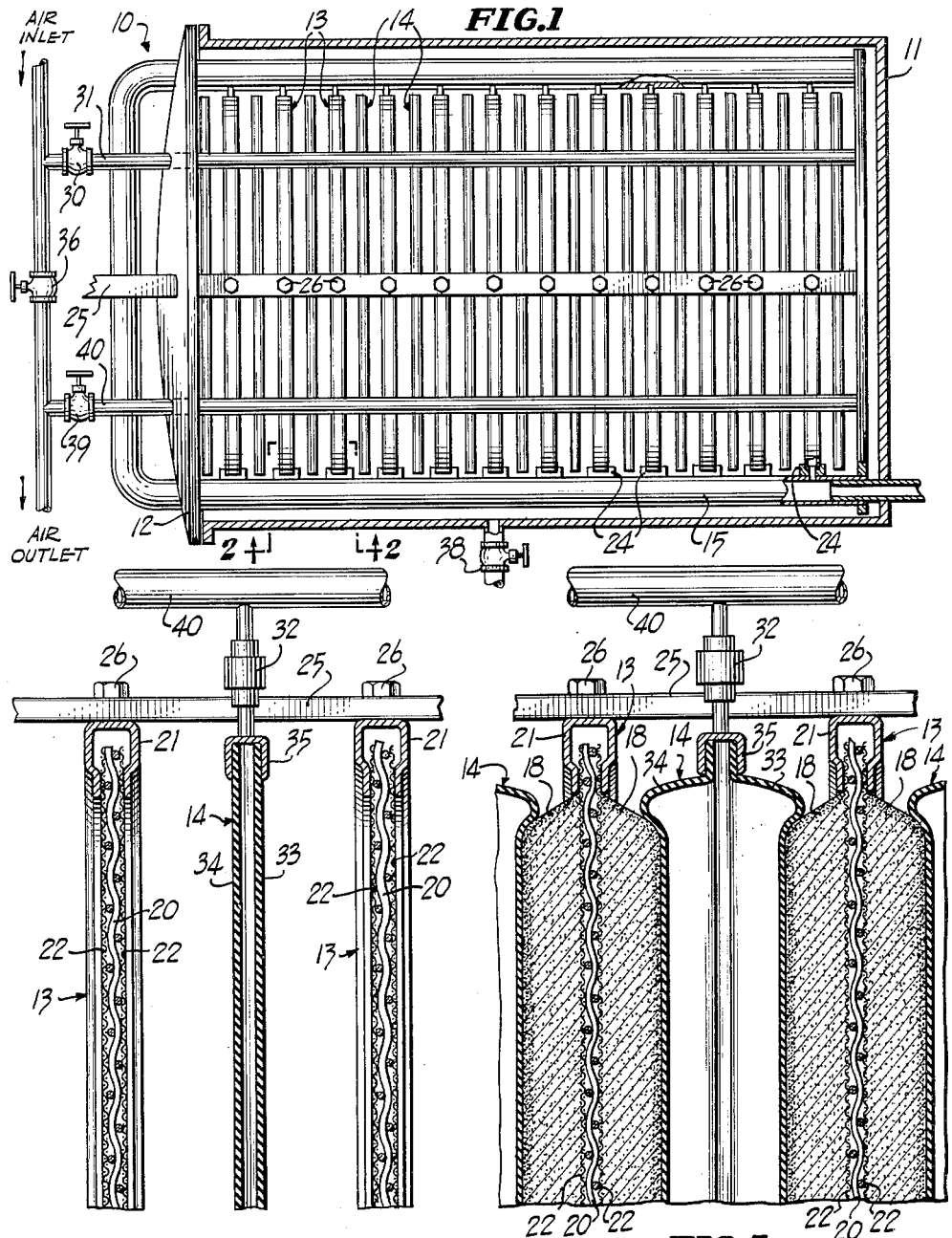

3,017,996
FILTRATION APPARATUS
Clay W. Riley, Palos Heights, Ill., assignor to Industrial Filter & Pump Mfg. Co., Chicago, Ill., a corporation of Illinois
Filed July 14, 1958, Ser. No. 748,281
1 Claim. (Cl. 210—346)

The present invention relates to filtration apparatus and more particularly to filtration apparatus which is suitable for use in removing sugar from the sediment remaining in settling tanks after raw sugar has been initially settled.

After the sugar juice has been initially extracted from sugar cane, it is placed in settling tanks for partial clarification, and following this initial clarification there remains in the tanks a precipitate in the form of a mud which is ten to fifteen percent sugar with the remainder thereof being pieces of sugar cane and soil from the canefield. In order to reclaim the sugar from this mud, the mud may be pumped through a filter having a plurality of perforate hollow filter leaves spatially arranged therein. As the mud is pumped through the filter, the solids are deposited on the outer surfaces of the leaves to build up a filter cake which is more compact on the inside than it is on the outside. Moreover, the inner portions of the cake are quite hard and dry while the outer portions contain a substantial amount of sugar syrup and are thus very wet and soft. The usual blow-down operation is ineffective to force the syrup out of the cake prior to the removal thereof from the leaves inasmuch as the air cannot get through the inner compact part of the cake nor can it effectively force the liquid from the outer part of the cake through the compact inner portions to the outlet of the filter.

In order to remove the filter cake from such filters, it has thus been the practice to drain the filter chambers of the unfiltered mud and to remove the cake from the leaves without first subjecting it to blow-down, or even if it is subjected to blow-down to remove the cake while the outer part is still wet and soft. Thereafter, the cake is removed from the leaves. With this prior art method of filter cake removal, a considerable quantity of sugar which is contained in the pores of the filter cake is lost; therefore, it would be desirable to provide a new and improved method of cake removal which avoids this loss of sugar.

An object of the present invention is to provide a new and improved filtration apparatus.

A further object of the present invention is to provide new and improved filtration apparatus for use in extracting the sugar from the mud remaining in settling tanks in which sugar cane juice is settled.

Briefly, the above and further objects are realized in accordance with the present invention by providing a filtering process in which the outer portion of the filter cake is compressed prior to its removal from the filter leaves, thereby to squeeze the sugar syrup from the pores thereof. In order to carry out this process there is provided filtering apparatus which includes a plurality of inflatable compression members which are interposed between pairs of adjacent hollow filter leaves on which the filter cakes are deposited, so that when the compression members are inflated they compress the filter cakes against the supporting filter leaves thereby to squeeze out the juice which is contained in the pores thereof.

The invention both as to its organization and method of operation, together with further objects and advantages thereof, will best be understood by reference to the following detailed description taken in connection with the accompanying drawing, in which:

FIG. 1 is a side elevational view, partly in section, of filtration apparatus embodying the present invention;

FIG. 2 is a sectional view taken along the line 2—2 of FIG. 1 and showing one of the bladders in a deflated condition; and FIG. 3 is a sectional view similar to FIG. 2 showing a bladder in an inflated condition to compress the filter cakes which are deposited on the adjacent filter leaves.

Referring now to the drawing and particularly to FIG. 1 thereof, there is shown a filter 10 of a type suitable for use in clarifying the mud which remains in the bottom of settling tanks in which the raw juice of sugar cane has been clarified by settling. The filter 10 comprises as its principal components a generally cylindrical tank 11, a removable cover 12, a plurality of filter leaves 13 which are disposed within the tank 11, and a plurality of bladders 14 which are respectively disposed between adjacent ones of the filter leaves 13. The filter leaves 13 are hollow perforate members of conventional construction and each has an internal cavity connected to a generally U-shaped outlet manifold 15 which exhausts from the tank 11 the effluent which flows into the cavities of the hollow filter leaves 13. In using the filter 10 to clarify a liquid, the liquid and associated solids are pumped under pressure into the filter chamber and thence through the filter leaves 13 into the outlet manifold 15. Because of the nature of the perforate surfaces of the filter leaves 13, or by virtue of a porous precoat layer which may be deposited on the perforate surfaces thereof, solid impurities which are contained in the liquid are extracted as the liquid passes through the leaves 13 and form a cake on the outer surfaces thereof. Preferably, the filter leaves 13 are rectangular in shape, having perforate filtering surfaces on the opposite faces thereof, and, as best shown in FIG. 1, the perforate faces of the filter leaves 13 are arranged in parallel relationship.

When the filter 10 is initially operated, the filter leaves 13 are substantially clean as shown in FIG. 2, but after the filter has been operated some time, a substantial filter cake 18, as shown in FIG. 3, is built up on the faces of the filter leaves 13. This cake retards the flow of fluid through the filter and must, therefore, be periodically removed. When the filter 10 is used for clarifying the mud remaining in settling tanks used in the cane sugar extracting process, this filter cake is relatively compact and hard in the immediate vicinity of the filter leaves 13, but it is quite porous and wet near the outer surfaces thereof. Accordingly, the usual blow-down method of removing the liquid from the filter cake is not effective.

Therefore, in accordance with the present invention, in order to remove substantially all of the syrup from the filter cakes before they are removed from the filter leaves 13, the bladders 14 are inflated, which, as best shown in FIG. 3, have a surface area exceeding that of the perforated surface of the adjacent leaves. Accordingly, when inflated, the peripheral portions of the bladders 14 overlie the marginal edges of the cakes 18 so that the filter cakes 18 are compressed against the respective filter leaves to squeeze the syrup out of the pores in the filter cake. Because of the relatively solid nature of the inner part of the cakes, the syrup which is squeezed out of the cake flows back into the tank rather than through the leaves 13 into the manifold 15. Consequently, it is desirable to squeeze the liquid out of the filter cakes before the tank is completely drained or at least while the leaves 13 are still in the tank 11 so that none of the syrup is lost. Therefore, before the tank 11 is drained, the bladders 14 are inflated to compress the filter cakes 18 between the bladders 14 and the leaves 13. With the cakes 18 thus compressed, the filter chamber is drained of the liquid contained therein, and since this liquid is sugar syrup it is returned to the original source of the liquid or other reservoir and later pumped through the filter 10. The cakes 18 are maintained under compression and thus held intact on the leaves by the inflated bladders throughout the draining operation so that the cakes are relatively dry when the tank 11 has been completely drained. The filter leaves 13 including the manifold 15 in which they are mounted and the cover 12 may then be withdrawn from the tank 11 and the filter cake 18, which is, at this time, substantially dry, may be removed from the leaves 13 in any convenient manner.

Considering the filtration apparatus 10 in greater detail, the filter leaves 13 are of any suitable rigid construction such, as best shown in FIGS. 2 and 3, as the type having a central grid or spacer portion 20 which is sandwiched between a pair of thin wire screens 22 and secured between a frame formed of a plurality of interconnected channel members 21. When the liquid or mud to be filtered is thus pumped into the tank through an inlet, not shown, it passes through the interstices of the screens 22 and into the peripheral channel formed in the frame members 21. From the members 21 the filtered syrup flows through respective ones of a plurality of tubular connectors 24 into the effluent outlet manifold 15. The connectors 24 secure one edge of the associated filter leaf to the manifold 15 and the opposite edges of the leaves 13 are also secured to the manifold 15, but do not necessarily communicate with the channel thereof.

In order to remove the dry filter cakes 18 from the filter leaves 13 after the leaves have been withdrawn from the tank 11, a shaker bar 25 extends through the cover 12 and is rigidly secured to each of the leaves 13 at the tops thereof by means of respective ones of a plurality of hexagonally headed bolts 26. Therefore, after the filter cakes 18 have been dried by inflation of the bladders 14, the cover 12 and the filter leaves 13 are physically removed from the tank 11 and a suitable vibrator (not shown) which may be fixedly connected to the vibrator bar 25 is then operated to shake the bar 25 in an axial direction and induce vibrations in the leaves 13 which shake the filter cakes 18 therefrom.

Considering in greater detail that portion of the filter 10 which is used to squeeze the syrup out of the filter cakes 18, when, as shown in FIG. 3, the filter cakes 18 have become sufficiently thick so as to greatly impair the efficiency of operation of the filter 10, the supply of liquid to the tank 11 is terminated and a valve 30 is opened to supply pressurized air to a tube 31 to which each of the bladders 14 is connected. The cavities within the bladders 14 are connected to the tubes 31 by means of suitable tubular connectors 32 of the type shown in FIG. 2. The bladders 14 each comprise a pair of planar resilient members 33 and 34, which may be formed of rubber or some other suitable elastic material, and a channel 35 seals off the edges of the members 33 and 34. The channel 35 may be resilient and made of rubber but, if expedient, it may be made of any other suitable material such as stainless steel. Accordingly, the bladders 14 are hermetically sealed units comprising resilient members 33 and 34 which are expanded when the internal pressure of the bladders 14 exceed the external pressure thereon. Accordingly, the bladders 14 become inflated to a condition such as that shown in FIG. 3 when the valve 30 is open. The valve 30 should be controlled so that the pressure within the bladders 14 inflates them to a point where a sufficient compressive force is exerted on the filter cakes 18 to squeeze the liquid from the pores thereof. With the bladders 14 thus inflated and, of course, the valve 36 closed, a suitable drain valve 38 is opened so as to drain the liquid from the tank 11. In order to prevent the bladders 14 from expanding to a point where they might burst as the liquid is drained from the tank 11, the valve 30 should be closed at the beginning of the drain operation, and a valve 39, which is connected between an air outlet such as the atmosphere and a pipe 40 to which all of the bladders 14 are connected, is gradually opened to reduce the internal pressure of the bladders 14 in such manner as to maintain a fixed pressure differential thereacross as the liquid is drained from the tank 11. When all of the liquid has thus been drained from the tank 11, the valve 39 is opened wide and the valve 36 also opened so that the air from the air inlet flows past the mouth of the tube 40 to provide a Venturi action which sucks out any of the air which may remain in the bladders 14. As shown, the bladders 14 are formed of a relatively thick material and may thus be positively collapsed to the condition shown in FIG. 2 without trapping any pockets of air therein which would deter the removal of the cake from the leaves at the location of such pockets. Thereafter, the valves 39 and 36 are closed in that order and the removable unit comprising the cover 12 and the leaves 13 are withdrawn from the tank 11 to remove the filter cakes 18 therefrom whereby they take on the appearance shown in FIG. 2. After the filter leaves 13 have been cleaned they are again inserted into the tank 11, the cover 12 is sealed thereto, and the filter 10 is again ready for operation.

While a particular embodiment of the invention has been shown, it will be understood, of course, that it is not desired that the invention be limited thereto since modifications may be made, and it is, therefore, contemplated by the appended claim to cover any such modifications which fall within the true spirit and scope of the invention.

Having thus described the invention, what is claimed as new and desired to be secured by Letters Patent of the United States is:

A filter comprising a pressure tank enclosing a filter chamber, a plurality of hollow, filter leaves mounted in said tank in spaced-apart, face-to-face relationship, the faces of said leaves each including a perforate surface area on which a filter cake is adapted to be deposited during operation of said filter, a plurality of inflatable bladders respectively disposed between said leaves, each of said bladders being spaced a sufficient distance from the adjacent leaves to provide space, when deflated, for said cakes to build up, said bladders having facial areas on opposite sides respectively exceeding the area of perforations on the adjacent leaf, the peripheral edges of each said leaf extending outwardly beyond the corresponding edges of the area of perforation on the adjacent leaves, and means to inflate said bladders to compress said cakes whereby the peripheral portions of said bladders, when inflated, extend at least partially over the edges of said cakes to maintain said filter cakes intact on said leaves.

References Cited in the file of this patent
UNITED STATES PATENTS

| | | |
|---|---|---|
| 1,308,918 | Schwable | July 8, 1919 |
| 1,308,943 | French | July 8, 1919 |
| 1,432,134 | Sweetland | Oct. 17, 1922 |
| 2,480,320 | Carrier | Aug. 30, 1949 |
| 2,715,965 | Carver | Aug. 23, 1955 |
| 2,843,267 | Anderson | July 15, 1958 |